No. 663,255. Patented Dec. 4, 1900.
J. W. BROWN, Jr.
CHUCK MECHANISM FOR AUTOMATIC CUTTING MACHINES.
(Application filed Nov. 23, 1899.)
(No Model.) 2 Sheets—Sheet 1.
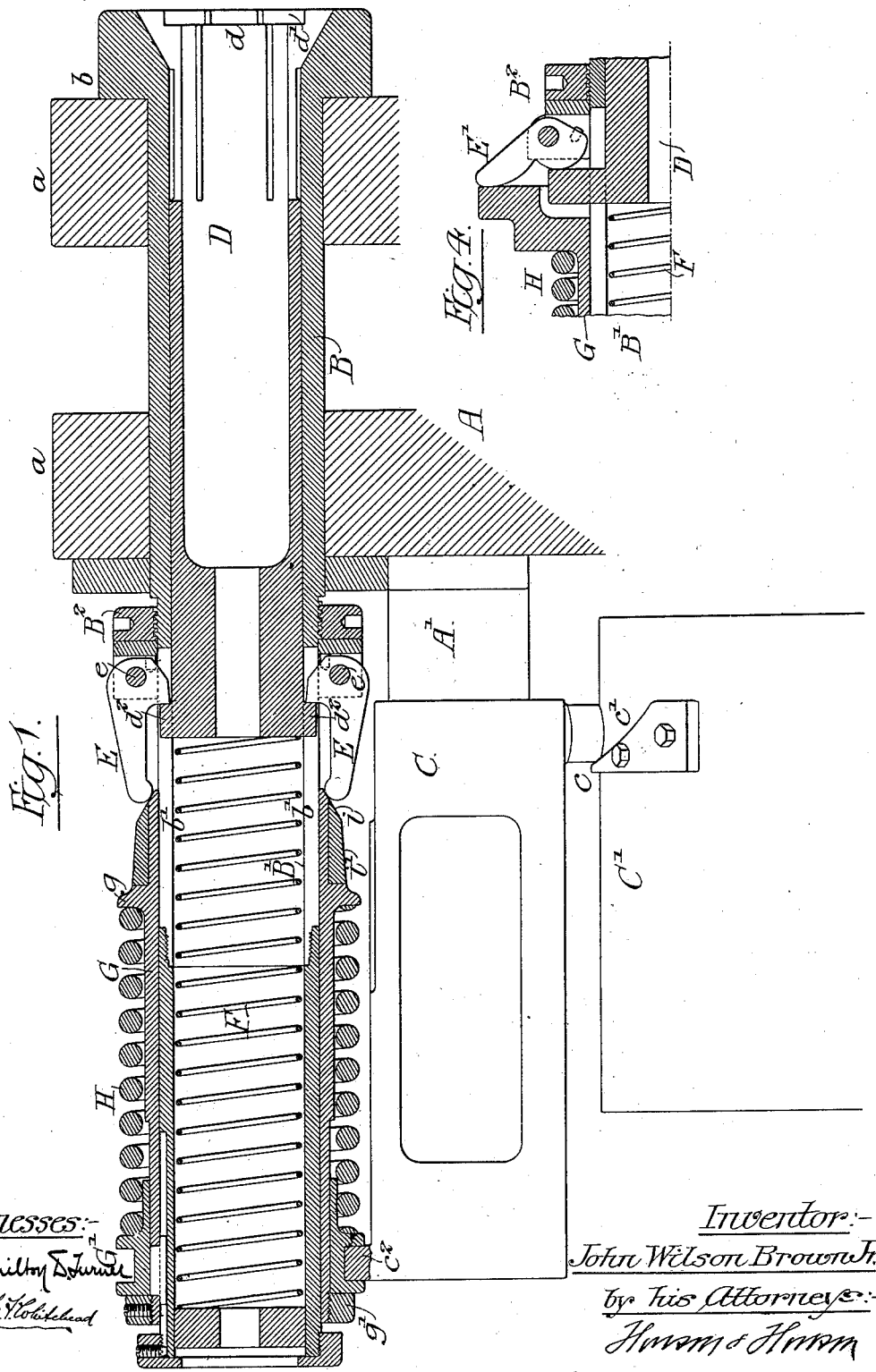
Witnesses:—
Inventor:—
John Wilson Brown Jr.
by his Attorneys:—

No. 663,255. Patented Dec. 4, 1900.
J. W. BROWN, Jr.
CHUCK MECHANISM FOR AUTOMATIC CUTTING MACHINES.
(Application filed Nov. 23, 1899.)
(No Model.) 2 Sheets—Sheet 2.
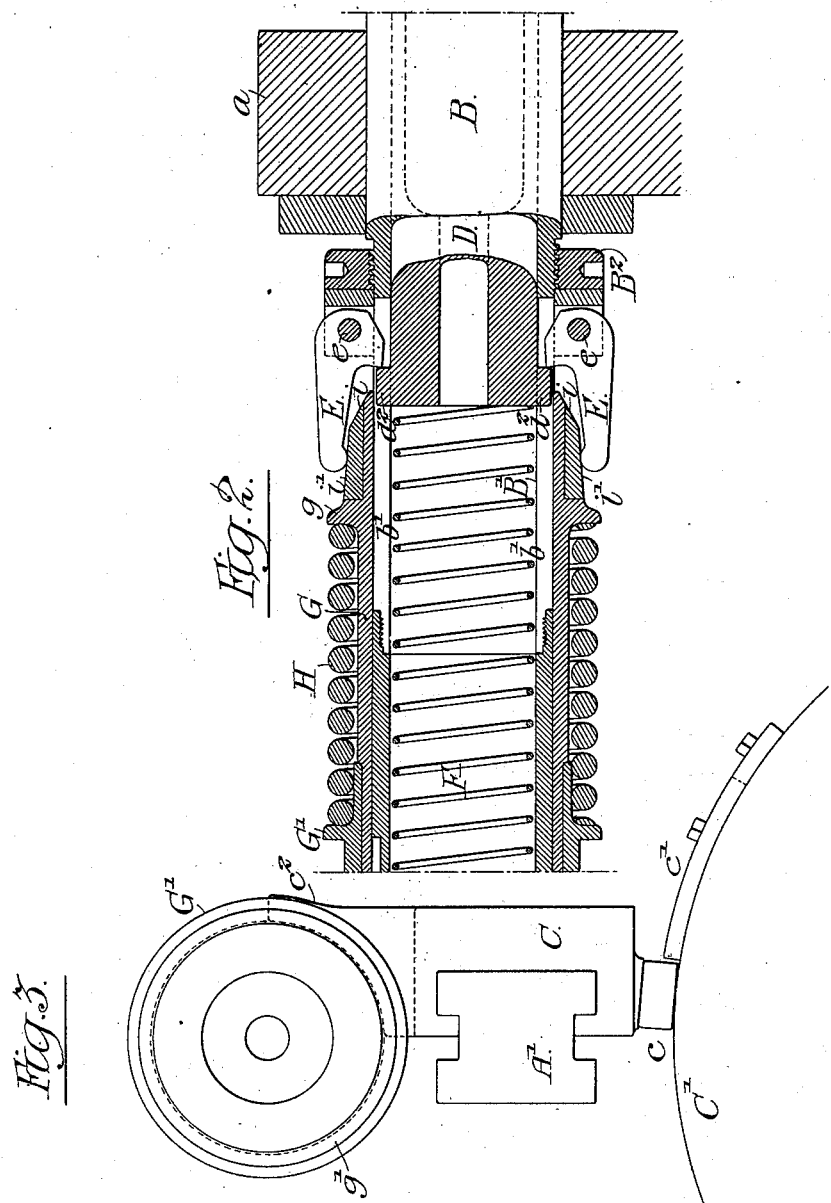
Witnesses:—
Inventor
John Wilson Brown Jr.
by his Attorneys

UNITED STATES PATENT OFFICE.

JOHN WILSON BROWN, JR., OF PHILADELPHIA, PENNSYLVANIA.

CHUCK MECHANISM FOR AUTOMATIC CUTTING-MACHINES.

SPECIFICATION forming part of Letters Patent No. 663,255, dated December 4, 1900.

Application filed November 23, 1899. Serial No. 738,104. (No model.)

*To all whom it may concern:*

Be it known that I, JOHN WILSON BROWN, Jr., a citizen of the United States, residing in Philadelphia, Pennsylvania, have invented certain Improvements in Chuck Mechanism for Automatic Cutting-Machines, of which the following is a specification.

My invention relates to certain improvements in chuck mechanism of automatic cutting-machines.

The object of my invention is to so construct the chuck that it will firmly grasp the article to be cut and will accommodate itself to articles differing slightly in size without straining the parts and without putting undue pressure upon the article and will readily release the article, as fully described hereinafter.

In the accompanying drawings, Figure 1 is a longitudinal sectional view illustrating my improved chuck mechanism for automatic cutting-machines with the chuck in the released position. Fig. 2 is a view of a portion of Fig. 1, showing the chuck-levers in the position when the chuck is closed. Fig. 3 is an end view of Fig. 1, and Fig. 4 is a view of a modification.

I have not shown the full frame of an automatic cutting-machine, as I can apply my invention to the ordinary type of machine, using turret mechanism for feeding the cutters and a cam wheel or bar for operating the chuck mechanism and a driven spindle, although in some instances the spindle may be stationary and the tool may revolve.

A is the frame of the machine, having bearings $a\ a$ for the hollow spindle B. This frame has an extension A', and adapted to guideways on this extension is a slide C, which has a pin $c$, with which engage cam-plates $c'$ on a cam-wheel C', mounted in bearings in the frame of the machine and driven in any suitable manner.

The hollow spindle B has a head $b$. The opening in the spindle is flared, as clearly shown, and adapted to this flared portion of the spindle is a conical head $d$ of a tubular clutch-bar D, split at its outer end and having a recess $d'$ for the reception of the article to be cut. By drawing the clutch-bar into the spindle the tapered head $d$ will travel on the tapered portion of the spindle, which will cause the chuck portion to contract and bind upon the article to be clutched, thus holding the article rigidly, as the split portions of the clutch-bar cannot yield, being backed by the solid spindle. When the clutch is moved in the opposite direction, the split portions are free of the spindle and the spring of the metal will cause the head to enlarge and release the article.

The spindle B has a tubular extension B', which is slotted at $b'$ for the reception of the lugs $d^2\ d^2$ on the rear end of the clutch-bar D. Screwed onto the extension B' in the present instance is a ring B² to which are pivoted at $e$ levers E E, the short arm of each lever resting in front of the lugs $d^2$ of the clutch-bar and the long arm of each lever resting in such position as to be actuated by a sleeve, as described hereinafter. Within the extension B' is a spring F, which tends to force the clutch-bar forward, so that the jaws will open as soon as the bar is released by the levers. Surrounding the extension B' is a sleeve G, having a flange $g$ at its forward end, and on the rear end of the sleeve is a nut $g'$. Adapted to the sleeve is a sliding collar G', and between this collar and the flange $g$ of the sleeve is a heavy spring H. Engaging with the collar G' is a segmental arm $c^3$, carried by the slide C.

The end of the sleeve G is tapered, the portion $i$ of the taper being abrupt and the portion $i'$ being very slight. I preferably make this end of the sleeve of hard metal, and in the present instance I use two hard-metal blocks set in the sleeve.

The operation of the clutch mechanism is as follows: The article is fed into the space $d'$ of the jaws of the clutch-bar by any suitable automatic mechanism or by hand. The cam C' moves the slide C forward, and this slide being connected to the collar G' moves it forward, and this motion is imparted to the sleeve G through the spring H, causing the tapered portion of the sleeve to pass under the long arms of the levers E, and as the arms move out the clutch-bar is drawn back by the short arms of the levers engaging the lugs $d^2$, and the article to be cut is clamped by the closing in of the jaws. As the motion of the sleeve continues the long arms of the levers ride upon the portion $i'$ of the sleeve, which is slightly tapered. Consequently additional pressure is brought to bear upon the clutch and the article clamped. As the connections between the levers and the article clamped are rigid, the limit of pressure will be reached during the travel forward of the sleeve, and the balance of the movement of the collar G' and slide C will be compensated for by the spring H, so that when the pieces differ slightly in diameter the clamp will exert apparently the same pressure upon them, and the balance of the movement will be taken up by the spring. The taper of the portion $i$ is such that the friction will hold the sleeve and prevent it backing off when the pressure on the spring is released until the collar G strikes the nut $g'$ on the rear portion of the sleeve, causing the sleeve to be forcibly pulled away from the levers.

In Fig. 4 I have shown a modification of my invention in which the levers E' are in the form of cams bearing against lugs on the rear of the clutch-bar, the long arm of each lever being in position to be acted upon by the sleeve.

It will be understood that in casting a large number of pieces of the same shape there will be a slight variation in the size of a piece, due to several causes, and heretofore it has been difficult to provide a clutch that will hold the piece rigidly and yet will compensate for the difference in diameter of the pieces.

I claim as my invention—

1. The combination of a tubular spindle, a chuck-bar adapted thereto, means for drawing the chuck-bar into the spindle to close the same, operating mechanism, and a spring wound around said spindle mounted between the operating mechanism and the levers for drawing in the chuck-bar, substantially as described.

2. The combination of a spindle, a chuck-bar mounted therein, one or more levers acting to draw the chuck-bar into the spindle to close the same, a sliding collar having a tapered portion, operating mechanism, a second collar sliding on the first adapted to engage said operating mechanism and a spring wound on the first collar and operating between the two collars, substantially as described.

3. The combination of a spindle, a chuck-bar adapted thereto, one or more levers engaging the chuck-bar, a sleeve having a double tapered portion over which one arm of the lever travels, one tapered portion being abrupt and the other less than the angle of repose, and means for moving the sleeve so that the levers will be engaged first by the abrupt incline of the sleeve and then by the slight incline, on which latter they will remain during the time that the chuck is in the closed position, substantially as described.

4. The combination of a spindle, a chuck-bar adapted thereto, one or more pivoted levers, one arm of each lever engaging the chuck-bar, a sleeve adapted to come in contact with the other arm of each lever, said sleeve having an abrupt tapered portion and a slight tapered portion, a spring back of the sleeve, and operating mechanism bearing against the spring, substantially as described.

5. The combination of a spindle, a chuck-bar adapted thereto, having a flange at its rear end, one or more pivoted levers engaging the flange, a sleeve having two tapered portions at one end, one more abrupt than the other, and having at the opposite end a flange, a collar adapted to slide upon the sleeve, a spring mounted between the collar and the flange on the forward end of the sleeve so that the pressure exerted to close the chuck will be through the spring, the collar striking the rear flange of the sleeve to release the chuck, substantially as described.

6. The combination of a tubular spindle, a chuck-bar therein, a collar sliding on said spindle and a second one sliding on the first, levers acting on the chuck-bar and actuated by a tapered portion on the first collar, a spring between the two collars, a second spring within the tubular spindle acting between one end of the spindle and the chuck-bar, whereby said bar is forced forward when it is released by the levers.

In testimony whereof I have signed my name to this specification in the presence of two subscribing witnesses.

JOHN WILSON BROWN, JR.

Witnesses:
WILL. A. BARR,
JOS. H. KLEIN.